United States Patent [19]

Lee et al.

[11] 3,838,223

[45] Sept. 24, 1974

[54] RING TRIP AND DIAL PULSE DETECTION CIRCUIT

[75] Inventors: David Q. Lee, Chicago; Donald W. McLaughlin, Bolingbrook, both of Ill.

[73] Assignee: GTE Automatic Electric Laboratories Incorporated, Northlake, Ill.

[22] Filed: Oct. 1, 1973

[21] Appl. No.: 402,513

[52] U.S. Cl. .......... 179/18 FA, 179/84 A

[51] Int. Cl. .......... H04m 3/02

[58] Field of Search .......... 179/18 F, 18 FA, 18 H, 179/84 R, 84 A, 81 R

[56] References Cited

UNITED STATES PATENTS

| | | | |
|---|---|---|---|
| 3,594,510 | 7/1971 | Blashfield | 179/84 R |
| 3,740,486 | 6/1973 | Freimanis | 179/18 FA |
| 3,764,752 | 10/1973 | Yachabach | 179/84 A |
| 3,766,325 | 10/1973 | Hatfield et al. | 179/84 A |
| 3,798,384 | 3/1974 | Shaffer | 179/84 R |

*Primary Examiner*—Thomas A. Robinson
*Attorney, Agent, or Firm*—Robert J. Black

[57] ABSTRACT

A ring trip and dial pulse detection circuit for use in a private automatic branch exchange (PABX) of the type wherein a pole change ring circuit controls the polarity of the output to the telephone handset. The dial pulse detector portion of the arrangement is optically coupled to the remaining portion of the arrangement, so that it is electrically isolated to minimize interface problems and circuits to a register or controller.

6 Claims, 11 Drawing Figures

RING TRIP AND DIAL PULSE DETECTION CIRCUIT

This invention relates to telephone communication systems, and more particularly, to an improved electronic private automatic branch exchange (PABX).

Private automatic branch exchanges traditionally have incorporated all of the switching techniques normally utilized in telephone central offices. Many of these types of private switching systems employ the well-known step-by-step or "Strowger" principle, while still others are of the common control type employing crossbar switches or similar devices as the technique for establishing a path between two stations.

The introduction of electronic techniques in circuitry to the telephone communication field to date has found its greatest utilization in the area of central office switching and signal transmission. Until recently, the usage of these techniques in PABX telephone systems has been limited primarily because of cost considerations. Certain recent developments primarily in the areas of common control equipment and particularly memory circuitry have made the design of electronic PABX's more attractive economically. Use of stored program common control and solid state devices permits a considerable reduction in the amount of equipment installed in customer premises.

In the hereinafter generally described private automatic branch exchange, electronically implemented, common control equipment of a generally conventional type and operation is used. The system is a two-wire system using junctors as a means of connecting two line circuits together via a solid state crosspoint matrix. The junctor has two ports on the outlet side of the matrix and the lines appear as inlets on the matrix.

The present invention particularly relates to a ring trip and dial pulse detection circuit for use in systems such as the disclosed private automatic branch exchange.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DESCRIPTION OF THE PREFERRED EMBODIMENT

Figure 1:
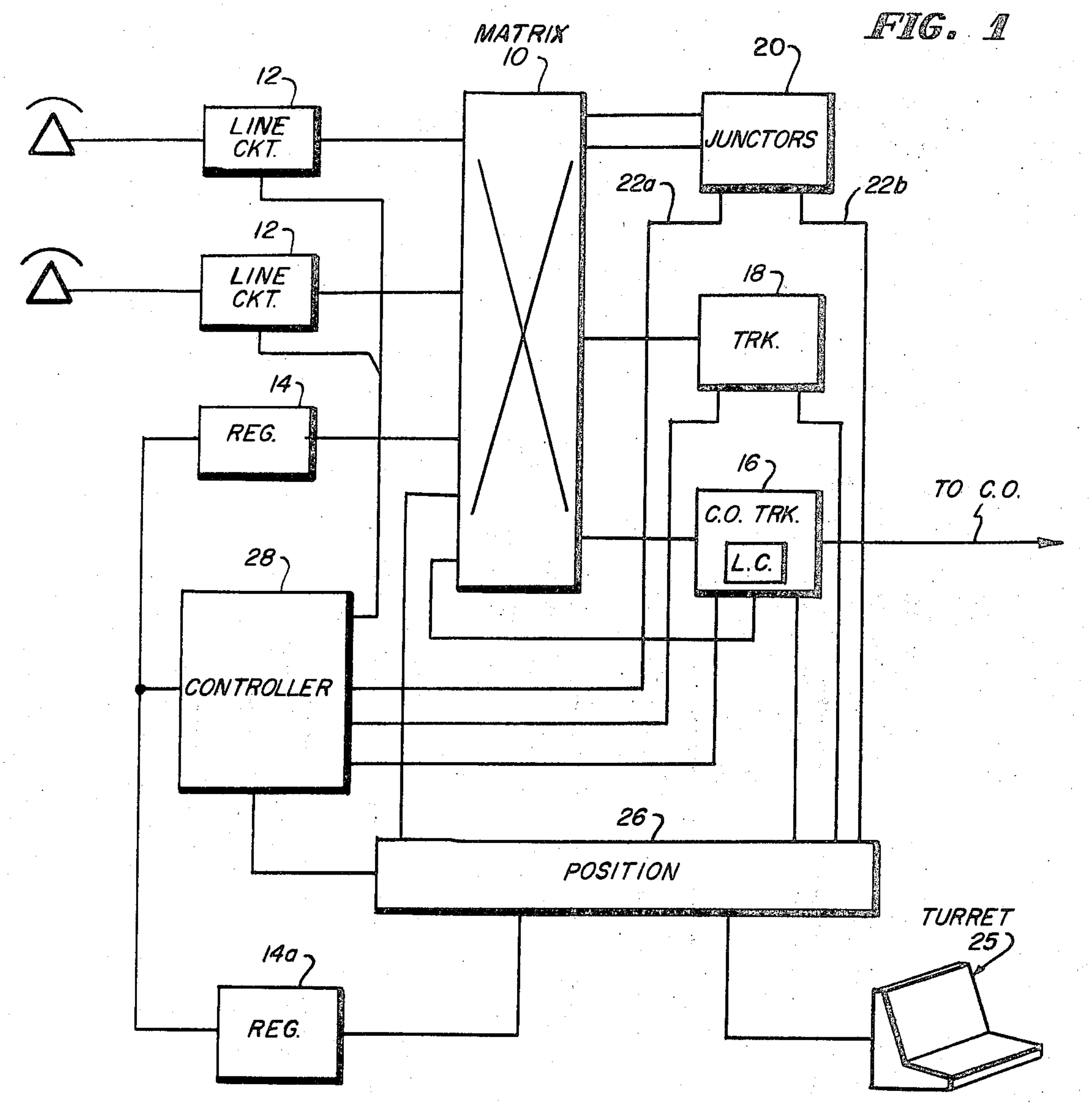
FIG. 1 is a block diagram schematic of the private automatic branch exchange.
Figure 2:
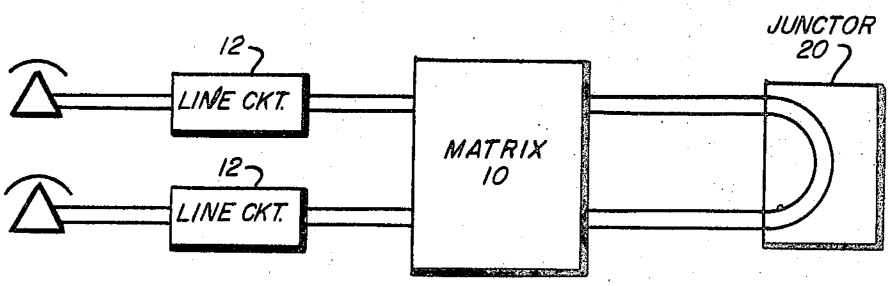
FIG. 2 is a block diagram representation of the two matrix paths allowing for a line to line connection.

Referring now to the drawings, and particularly FIG. 1 thereof, the electronic private automatic branch exchange can be seen to include a single stage matrix 10 with lines on line circuits 12 and registers 14 as inlets, and central office trunks 16, information trunks 18 and junctors 20 as outlets. In the illustrated embodiment, the matrix 10 provides a maximum of 96 inlets and 48 outlets. As indicated above, the system is a two wire system using the junctors 20 as a means of connecting two line circuits 12 together via the matrix 10. For this purpose, each junctor 20 has two ports on the outlet side of the matrix 10 and the line circuits 12 appear as inlets on the matrix, thus two matrix paths allow for a line to line connection, as generally illustrated in FIG. 2. Each central office trunk 16 has an inlet associated with it to provide a hookswitch transfer feature, as described more fully below. Briefly, the system's construction and operation are as set forth in the paragraphs below.

The line circuits 12 and the junctors 20 are all electronic, containing no HQA relays. DC signalling is used, and busy tone is injected via the junctors 20. Disconnection control is in the junctors 20, and allows an off-hook flash to pass through the junctors 20 without disconnecting.

The single stage matrix 10 is a solid state crosspoint matrix of the type generally well-known in the art.

The central office trunks 16 and the information trunks 18 contain hybrid circuits in that HQA relays and transistor and IC logic all are used. In the illustrated embodiment, a maximum of 22 central office trunks can be provided, and each contains half the junctor (provides the outlet matrix termination), the central office interface (electromechanical), an abbreviated line circuit (for hookswitch transfer inlet matrix termination), timing and control logic (recognized hookswitch flash, disconnect, etc.), and system interface (two marker highways and position interface).

There are a maximum of four information trunks 18. The approach to extendable trunk operation is to switch the line to an idle central office trunk via position and controller operation rather than extending through the trunk. If four information trunks 18 are provided, 20 central office trunks 16 can be used and if 2 information trunks 18 are provided, all 22 central office trunks 16 can be used.

There are a total of four registers 14 in the system, with one (register 14*a*) being reserved for the position circuit 26 and the other three for non-position generated calls. Accordingly, the smallest system configuration requires two system registers and one position register.

The operation of the private automatic branch exchange is controlled by a turret 25, a position circuit 26 and a controller 28. The turret 25 may be a Type 80 turret of the G.T.E. Automatic Electric Inc. type, or its equivalent, which provides up to 22 central office trunk keys and four information trunk keys. Included with the many features of such a Type 80 turret which are associated with an operated trunk key, are split inward, split outward, monitor, hold, break-in and camp on.

The position circuit 26 provides single turret operation and provides logic to interface 22, central office trunks 16 and four information trunks 18. It also contains the turret interfaces not terminated directly to the trunks, that is, the turret to system signals either terminate directly to the trunks or the position circuit. The position circuit 26 also provides the interface to the controller 28, the interface to its registers 14 and the PAX line logic.

The controller 28 includes the following circuits and operations: a marker which provides path control, termination interfaces for seizure detection, busy/idle checks, class mark reception, and recognition of register and position requests for service; a translator which provides class mark decodes, numbering plan, and routing restrictions and selection (function of dialed digits); a register memory which is four, 12 bit memory words per register and read/write logic; a position and feature interface which allows the position and feature circuits to request various marker functions; and a system controller and clock which provides miscellaneous detection logic, sequence controls and system timing.

For the purpose of generally illustrating the operation of the private automatic branch exchange, in FIGS. 3–5, the method of operation for five typical operations is illustrated. All features of the system are provided using similar basic operations. By using inlet and outlet class marks, restrictions and routing selections are accomplished in conjunction with the dialed digit or digits. All routing is single digit except line selection which is always 2_xx_ where the second and third digits determine the line identity.

Figure 3A:
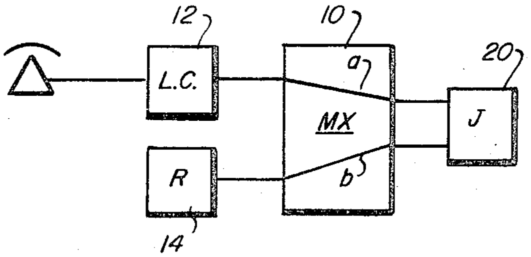
FIGS. 3A–D, 4A–B and 5A–B generally illustrate the operation of the system for several typical operations.
Figure 3B:
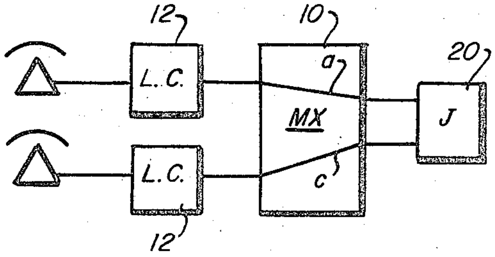

For example, as generally illustrated in FIGS. 3A and 3B, on a line-to-line call (dial 2_xy_), the line circuit 12 is seized and coupled through the matrix 10, via the indicated path a, to a junctor 20, and then from the junctor 20 to a register 14, via the indicated path b through the matrix 10. The controller 28 controls the establishment of the connections through the matrix 10. Dial tone is returned and, after dialing, the junctor 20 is coupled to the called line's line circuit 12, via the indicated path c (FIG. 3B) through the matrix 10. Ringing is extended to the called line and, upon answer, ring trip and conversation takes place, followed by release.

Figure 3C:
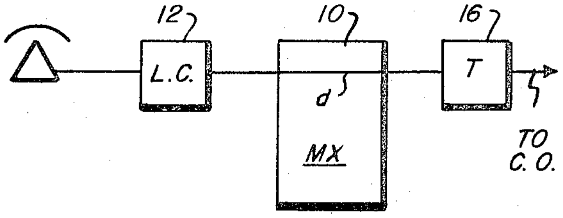

On a line-to-trunk call (dial 9), the calling line is coupled through the matrix 10 to a junctor 20, and hence to a register 14, in the same manner as described above and illustrated in FIG. 3A. In this case, however, the line circuit 12 is coupled through the matrix 10, via the indicated path _d_, directly to a central office trunk 16, as illustrated in FIG. 3C. Dial tone is received from the central office, and dialing is to the central office. The latter also returns ringback, answer and ring trip. Following conversation, release occurs.

Figure 3D:
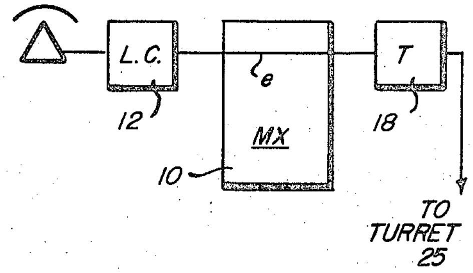

On a line-to-turret call (dial 0), the line circuit 12 again is coupled to a register, as illustrated in FIG. 3A, and then, as shown in FIG. 3D, to an information trunk 18, via the indicated path e through the matrix 10, which connects the line circuit to the turret 25. After ringing the turret, answer, ring trip and conversation occurs, followed by release.

Figure 4A:
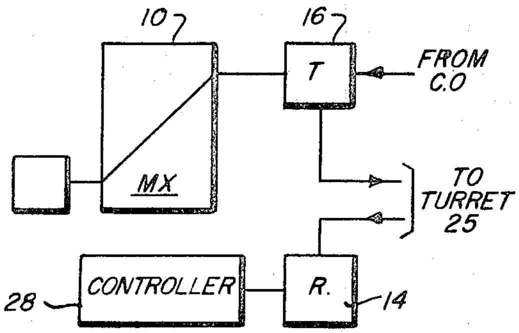
Figure 4B:
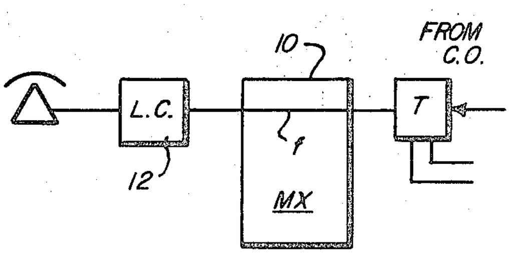
Figure 5A:
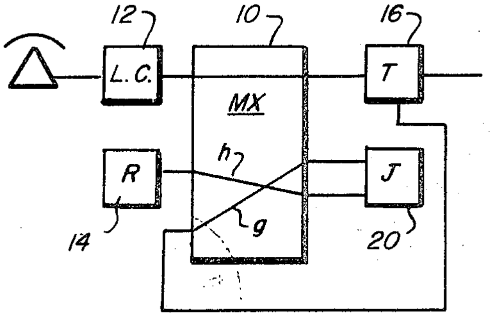
Figure 5B:
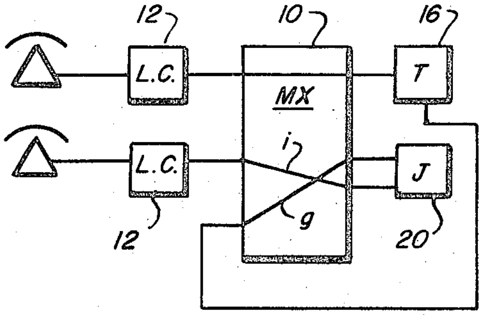

FIGS. 4A and 4B illustrate the operation on a trunk to line via turret call. The call is extended through a central office trunk to the turret 25, whereupon ringing the seizure takes place. Upon answer, the call is extended to the position circuit 26 which couples the central office trunk to a position register 14 that is wired to the position circuit. Dial tone is returned, and dialing is performed at the turret 25. The central office trunk 16 is coupled through the matrix 10, via the indicated path _f_, to the line circuit 12, as illustrated in FIG. 4B. The line circuit 12 is rung, and after answer, ring trip and conversation, release occurs.

During hookswitch transfer, on a call established from a trunk to a line via the turret in the manner described above and illustrated in FIGS. 5A and 5B, the line circuit 12 upon a hookswitch flash is coupled through the central office trunk 16 and the matrix 10, via the indicated path g, to a junctor 20. From the junctor 20, it is again extended through the matrix 10, via the indicated path _h_, to a register 14. Dial tone is returned and, upon dialing, a path is established from the junctor 20 to the called line circuit 12 through the matrix 10, via the indicated path _i_. The line circuit is rung and following answer, ring trip, conversation and release again occur.

From the above general description of the operation of the private automatic branch exchange, it can be seen that supervision requirements in the system call for off-hook/ on-hook signalling both ways via the junctors 20 and for the junctors to act on these signals, that is, the junctors 20 do not just pass them on. This type of supervision allows for the following functions:

a. Line seizure seen at the line.

b. Dial pulsing to the register via the junctor. This is from the originating line into the junctor and out of the junctor to the register which looks like a terminating line to the junctor.

c. With ringing enabled, the control being in the junctor, the answer must be passed
to the junctor to "trip" the ringing.

d. If a busy line was encountered, the busy tone is controlled in the junctor to the originating line. The on-hook must be sent to the junctor to "trip" the busy tone.

e. The hold path is controlled in the junctor so disconnect (on-hook) must be passed on to the junctor from both the originating and terminating line.

f. The above conditions do not require signals from the terminating line or the junctors to be sent to the originating line.

In order to provide signalling both ways through the two wire junctors 20, the sending and receiving functions are segregated to limit voltage and current levels so that voltage source variations and component tolerance variations will not result in overlaps of levels. This results in simpler level detectors and injectors (cause controlled level variations). The send-receive functions also are flipped in the junctors using cross-wired detector-injector operations, to allow the junctors to sense the detector outputs as they are fed into the injectors.

From the above description, it can be seen that the system's operation also is such that the junctors 20 must control the release function of the paths connected through the matrix 10 to the junctor, once the final connection is established. This requires checking the on-hook condition of both lines, that is, originating and terminating. A hook-switch flash, however, must pass through a junctor 20 without disconnect occurring. Furthermore, prior to the final connection being established, the path to the register 14 must be dropped and, if the termination is a trunk, the junctor 20 must also be released. These must be quick operations so the timed release must be overridden.

The method of signalling both ways through the two wire electronic junctor 20, and the method of detecting true disconnect functions and for passing a hookswitch flash are fully described and claimed in copending U.S. Pat. applications, Ser. No. 402,530, and Ser. No. 402,529, both filed Oct. 1, 1973. Reference, therefore, may be made to the applications for a more detailed disclosure of the system's operation with respect to these functions.

As indicated above, the present invention is particularly concerned with a ring trip and dial pulse detector circuit for the system, which provides the function to detect operation of a hookswitch during ringing. The detection circuit also can be used to reproduce dial pulses when incorporated with other types of ring input circuits.

Figure 6:
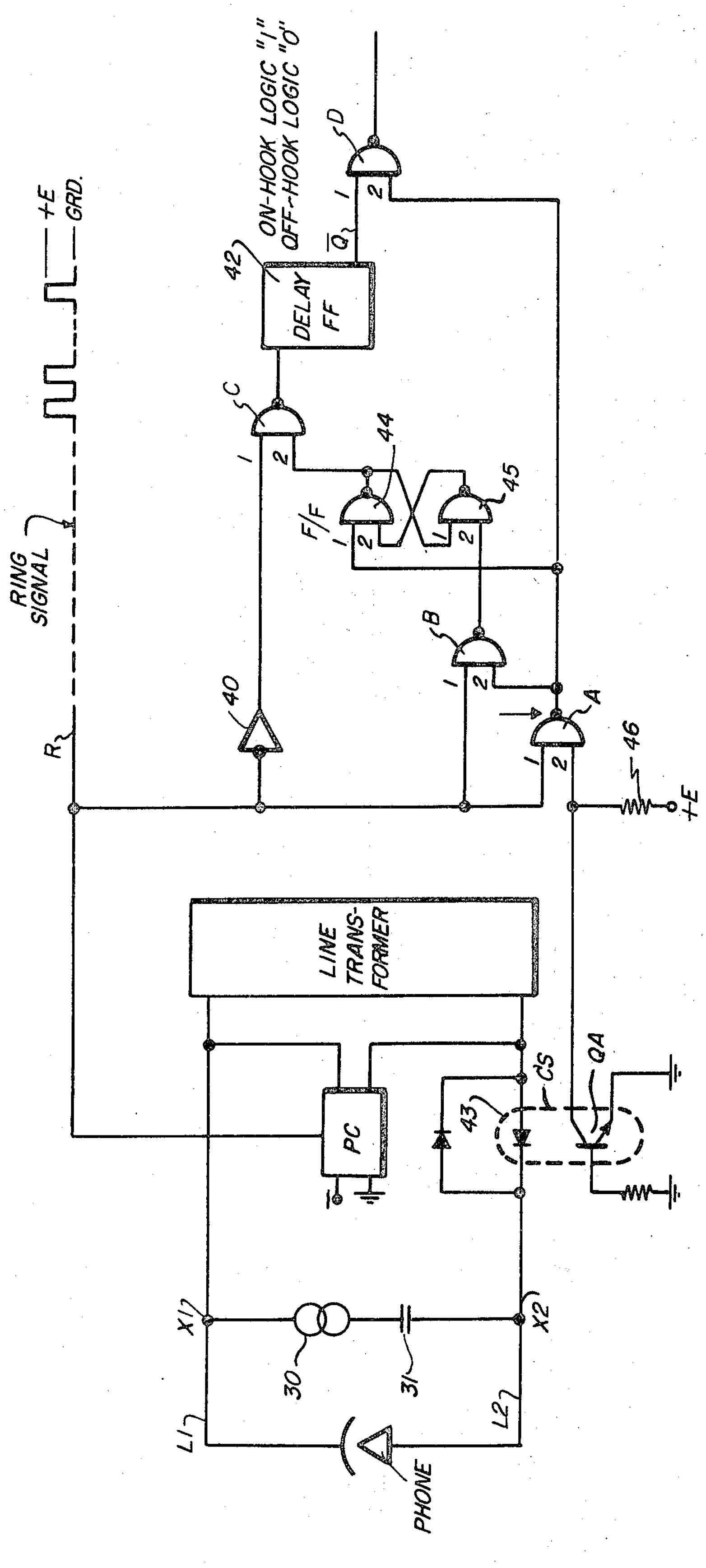
FIG. 6 illustrates the ring trip and dial pulse detection circuit within one of the line circuits of the system.

In FIG. 6, one of the line circuits 12 is partially illustrated, with the same being coupled with a telephone handset including a ringer 30 and a ringer capacitor 31. The line circuit 12 also includes a pole change circuit PC and the ring trip and dial pulse detect circuit described more fully below.

Generally, the polarity of output lines L1 and L2 to the telephone handset are controlled by the pole change circuit PC. A junctor 20 places a logic 1 on point R, when the line circuit 12 is in its idle state or is originating a call. This logic 1 operates the pole change circuit PC to present –V on line L1 and ground on line L2. A logic 1 , therefore, also is placed to the input of an inverter gate 40 and the inputs 1 of NAND gates A and B. A logic 0 exits from the inverter gate 40 to the input 1 of NAND gate C. The output from NAND gate C is a logic 1 irrespective of the logic signal present at its input 2, thus the NAND gate B and the flip-flop F/F have no effect on the NAND gate C when a logic 1 is present on point R.

The monostable delay circuit 42 requires a logic 0 at its input to trigger, hence with a logic 1 at its input, its $\overline{Q}$ output remains at a logic 1 level, and this output is coupled to the input 1 of the NAND gate D.

With the telephone handset in the on-hook condition, current through the diode detector 43 of the current detector circuit CS is insufficient to operate its output transistor QA which is optically coupled with the diode detector 43. In this condition, the +E via the resistor 46 is allowed to appear as a logic 1 to the input 2 of the NAND gate A. Since a logic 1 is present on its input 1, its output to input 2 of NAND gate D is a logic 0. This forces NAND gate D to output a logic 1 which, in this system, constitutes or indicates an on-hook signal, to a register 14 or the controller 28.

If the telephone handset is in an off-hook condition, sufficient current flows through the diode detector 43 to operate the output transistor QA, thus placing a ground or logic 0 level signal on the input 2 of NAND gate A. Now, the output of NAND gate A becomes a logic 1, and this logic 1 signal is coupled to input 2 of the NAND gate D. Since logic 1 signals now are on both the inputs 1 and 2 of the NAND gate D, its output changes to a logic 0 which, in the system, constitutes or indicates an off-hook signal.

Accordingly, it can be seen that the NAND gate D is operated in accordance with the on-hook and off-hook conditions of the telephone handset, to output a logic 1 signal or a logic 0 signal to indicate to a register 14 or the controller 28, these corresponding conditions. Since dial pulses are a series of on-hook/off-hook conditions, the output signals of NAND gate D would electrically duplicate the mechanical operation of the conventional rotary dial of the telephone handset to logic 1 and logic 0 signals.

The ring signal is a series of pulses (between +E and ground) which correspond to logic 1 and logic 0 signals and is coupled to the line circuit 12 from a junctor 20. When a ring signal is placed at point R, the pole change circuit PC which may be of conventional design places –V on line L2 and ground on line L1, on logic 0, and places ground on line L2 and –V on line L1, on logic 1. this alternate reversal of battery (–V) and ground to lines L1 and L2 provides sufficient power to operate the ringer 30, if the telephone handset is on-hook.

Detection of ring trip is as follows. In the quiescent state, that is, prior to receiving a ring signal, the pole change circuit PC in the line circuit 12 places a logic 1 at the point R, as described above. Also, because of the high resistance, current through the diode detector 43 is not sufficient to operate the output transistor QA, thus a logic 1 is present on the input 2 of the NAND gate A. Since a logic 1 also is present on the input 1 of NAND gate A, it outputs a logic 0 to the input 2 of the NAND gate D which outputs a logic 1 to indicate the on-hook condition.

The NAND gate A also outputs this logic 0 to the input 2 of the NAND gate B. At this time, NAND gate B outputs a logic 1 to the input 2 of gate 45 of the flip-flop F/F to set it. When the flip-flop F/F is set, the output of its gate 44 is a logic 1 and this signal is coupled to the input 2 of the NAND gate C. With a logic 0 on the input 1 of NAND gate C, its output is a logic 1 irrespective of the input on its input 2, hence the signal from the flip-flop F/F has no effect at this time.

When a ring signal commences, a logic 0 is initially placed at point R and coupled to the pole change circuit PC. This signal causes the pole change circuit PC to operate to place –V on the line L2 and ground on the line L1. Since this reverse biases the diode detector 43, the output transistor QA is not turned on, and a logic 1 is presented to the input 2 of NAND gate A.

From point R, a logic 0 also is placed on input 1 of NAND gate A, forcing its output to a logic 1. The invertor 40 also receives a logic 0, and outputs a logic 1 to input 1 of NAND gate C. Since a logic 1 is on the input 2 of the NAND gate C during the idle or quiescent state, the NAND gate C will now output a logic 0 to the input of the monostable delay circuit 42 to thereby cause its $\overline{Q}$ output remains a logic 0. This logic 0 output is placed on input 1 of the NAND gate D and, with a logic 1 from the NAND gate A on its input 2, the NAND gate D still outputs a logic 1 indicating an on-hook condition.

The subsequent signal of the ring signal, a logic 1 signal, operates the pole change circuit PC to place –V on line L1 and ground on the line L2 so that the diode detector 43 now is forward biased. The current flow through the diode detector 43 now turns on transistor QA. When the series ring capacitor 31 is charged (it has a charge time less than the ring frequency), the current through the diode detector 43 is not sufficient to keep the transistor QA turned on. Accordingly, initially when the transistor QA is turned on, a logic 0 is on the input 2 of NAND gate A and a logic 1 is on its input 1 (from point R) so that the NAND gate A outputs a logic 1. When its input 2 goes to a logic 1 (when transistor QA turns off), the NAND gate A then outputs a logic 0, setting the flip-flop F/F.

Since the input 1 of the NAND gate D is held to a logic 0 by the monostable delay circuit 42, the output of NAND gate D is not affected by the logic state changes of the output of NAND gate A, and remains at a logic 1 indicating an on-hook condition.

During the period when the output of NAND gate A is at a logic 1, the output of NAND gate B is a logic 0 since both its inputs 1 and 2 now are at a logic 1. The output of NAND gate B being at a logic 0 resets the flip-flop F/F.

In other words, when a logic 1 is on point R, the NAND gate A sets the flip-flop F/F if the current detection circuit CS senses no current or current through the diode detector 43 has decreased to a point where it cannot be detected. However, if current flow is detected and remains during this logic 1 state at point R, the logic output from NAND gate A would enable NAND gate B to reset the flip-flop F/F.

When point R changes to a logic 0, the output of inverter 40 allows NAND gate C to sense the status of the flip-flop F/F. If it is set, the NAND gate C outputs a logic 0 triggering the monostable delay circuit 42. If it is reset, the NAND gate C is enabled to output a logic 1 which has no effect on the operation of the monostable delay circuit 42.

Now, if the telephone handset goes off-hook, sufficient current flows through the diode detector 43 during the logic 1 state at point R to cause transistor QA to turn on, thus placing a logic 0 on the input 2 of NAND gate A so that it outputs a logic 1. This enables NAND gate B to output a logic 0 to reset flip-flop F/F. On the succeeding logic 0 ring signal, the NAND gate C is enabled to output a logic 1, so that the monostable delay circuit 42 is not triggered. When the telephone handset is off-hook for one ring cycle (one logic 1 and one logic 0), the monostable delay circuit 42 reverts to its idle state, that is, it outputs a logic 1 from its $\overline{Q}$ output. This logic 1 is presented on input 1 of NAND gate D and, since a logic 1 also is present on its input 2, the NAND gate D will output a logic 0 signal indicating an off-hook condition.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. In a communication system including a pair of line circuits coupled to a junctor via a matrix, said system being a two wire system and each of said line circuits appearing as an inlet on said matrix and said junctor having two ports on the outlet of said matrix, each of said line circuits being coupled with a telephone handset having a dial and ringer and each including a pole change ring circuit for alternately reversing the battery and ground connections to said ringer to energize it, and circuit means for coupling signals including ringing signals to said pole change ring circuit, the improvement comprising an arrangement for detecting dial pulses, said arrangement comprising a first gating means, a second gating means, the output of said first gating means being coupled to said second gating means, a current detector for detecting current flow through said telephone handset and line circuit having an output coupled to said first gating means, the circuit means being coupled to and normally providing a first predetermined signal to said first gating means and to the pole change ring circuit, the latter being operated to connect the battery and ground connections such that current flow through said line circuit and telephone handset when the latter is on-hook is restricted and said current detector is inoperative to couple an output signal to said first gating means, the telephone handset in being off-hook causing current to flow through it and the line circuit, said current detector upon detecting said current flow coupling an output signal to said first gating means, said first gating means responsive to said first predetermined signal coupling an output signal to said second gating means to operate the latter to provide an output signal indicating an on-hook condition and responsive to said first predetermined signal and said output signal from said current detector coupling an output signal to said second gating means to operate the latter to provide an output signal indicating an off-hook condition, whereby dial pulses which are a series of on-hook/ off-hook conditions are detected by said arrangement and electrically duplicated by the output of said second gating means.

2. The improvement of claim 1, wherein said current detector comprises a diode and a transistor optically coupled with and operated by said diode, whereby the dial pulse detector portion of said arrangement is electrically isolated so that interface problems and circuits to a register or controller are at a minimum.

3. The improvement of claim 1, wherein said first and second gating means each comprises a NAND gate.

4. The improvement of claim 3, wherein said first predetermined signal comprises a logic 1 level signal, said first gating means responsive to said logic 1 level signal coupling a logic 0 level signal to said second gating means to operate the latter to provide a logic 1 level signal output indicating an on-hook condition and responsive to said logic 1 level signal and a logic 1 level signal output from said current detector coupling a logic 0 level signal to said second gating means to operate the latter to provide a logic 0 level signal output indicating an off-hook condition.

5. The improvement of claim 1, further comprising delay means coupled to said second gating means, a third gating means, said first gating means being coupled to said third gating means, flip-flop means, said first and third gating means being coupled to said flip-flop means for setting and resetting it, a sensing gate for sensing the set and reset state of said flip-flop means coupled to said delay means, the circuit means coupling a ringing signal comprising alternate pulses of a first and a second level to said first, third and sensing gating means and to the pole change ring circuit, the pole change ring circuit being responsive to said first and second level signals to alternately reverse the battery and ground connections to cause and to restrict current flow through the ringer and line circuit, respectively, when said handset is on-hook, said first gating means responsive to said first level signal and an output signal from said current detector enabling said third gating means to reset said flip-flop and responsive to only said first level signal to set said flip-flop, said sensing gate responsive to said second level signal sensing the set and reset state of said flip-flop means and triggering said delay means if said flip-flop means is set, said delay means upon being triggered enabling said second gating means to provide an output signal indicating an on-hook condition.

6. The improvement of claim 5, wherein said handset in being off-hook permits current flow through the handset and the line circuit which is detected by said current detector, said first gating means being enabled responsive to said first level signal and an output from said current detector upon detecting said current flow to enable said third gating means to reset said flip-flop, whereby said delay means is not triggered by said sensing gate during the following second level signal, said delay means being set to the ring frequency and reverting to its idle state after one ring cycle if it is not triggered by said sensing gate, said delay means upon reverting to its idle state enabling said second gating means to provide an output signal indicating an off-hook condition.

* * * * *